United States Patent [19]
Berg et al.

[11] Patent Number: 6,117,200
[45] Date of Patent: Sep. 12, 2000

[54] ELECTROMAGNETIC FILTER CLEANING SYSTEM

[75] Inventors: David W. Berg, Plymouth; Bruce F. Field, Golden Valley; Joseph L. Pouliot, Elk River, all of Minn.

[73] Assignee: Tennant Company, Minneapolis, Minn.

[21] Appl. No.: 09/112,393

[22] Filed: Jul. 9, 1998

Related U.S. Application Data

[63] Continuation-in-part of application No. 08/802,372, Feb. 19, 1997, Pat. No. 5,829,094, which is a continuation-in-part of application No. 08/623,698, Apr. 15, 1996, Pat. No. 5,711,775.

[51] Int. Cl.[7] .............................. A47L 9/20; B01D 46/04
[52] U.S. Cl. ............................... 55/287; 15/352; 55/289; 55/300; 55/304
[58] Field of Search ................................ 15/340.1, 352; 55/284, 287, 288, 289, 296, 299, 300, 304; 95/278, 282; 96/400, FOR 169

[56] References Cited

U.S. PATENT DOCUMENTS

| | | |
|---|---|---|
| 3,543,483 | 12/1970 | Sheehan . |
| 3,545,178 | 12/1970 | Sheehan . |
| 3,938,971 | 2/1976 | McClure .................................... 55/300 |
| 4,099,940 | 7/1978 | Mortensen et al. . |
| 4,258,451 | 3/1981 | Sommerfeld . |
| 4,345,353 | 8/1982 | Sommerfeld . |
| 4,787,923 | 11/1988 | Fleigle et al. .............................. 55/304 |
| 5,013,333 | 5/1991 | Beaufoy et al. ........................... 55/300 |
| 5,194,077 | 3/1993 | Bargiel et al. ............................. 55/300 |
| 5,711,775 | 1/1998 | Field et al. ................................ 15/352 |
| 5,829,094 | 11/1998 | Field et al. ................................ 15/352 |

*Primary Examiner*—C. Scott Bushey
*Attorney, Agent, or Firm*—McEachran, Jambor, Keating, Bock & Kurtz

[57] ABSTRACT

A mobile surface maintenance machine has a cleaning brush and a dust collection system mounted on the machine. The dust collection system includes a vacuum fan, a filter housing having an air inlet and a pleated filter element positioned within the housing with its upstream side being in communication with the housing air inlet. The filter housing has separate, side-by-side, chambers on the downstream side of the filter. There are electrically operated valves located in the filter housing on the downstream side of the filter element, with the valves being in communication with the vacuum fan. There is one valve controlling air flow from each chamber. The filter element is functionally divided into separate, but joined, pleated sections, with each section being aligned with one of the chambers. There is an electric actuator mounted on the downstream side of each pleated filter section and there is a pleat moving element associated with and movable by each electric actuator. The pleat moving elements each are in engagement with only the pleats in one filter section. The application of electric power to the actuators causes movement of the pleat moving elements which move the filter pleats in a vibratory manner in a direction generally perpendicular to folds in the pleats. There is a control circuit for coordinating the application of power to the actuators and the valves whereby when power is applied to an actuator to impart vibratory motion to one pleated section, the valve associated with the chamber aligned with the one pleated section is operated to essentially shut off air flow through the one pleated section.

13 Claims, 5 Drawing Sheets

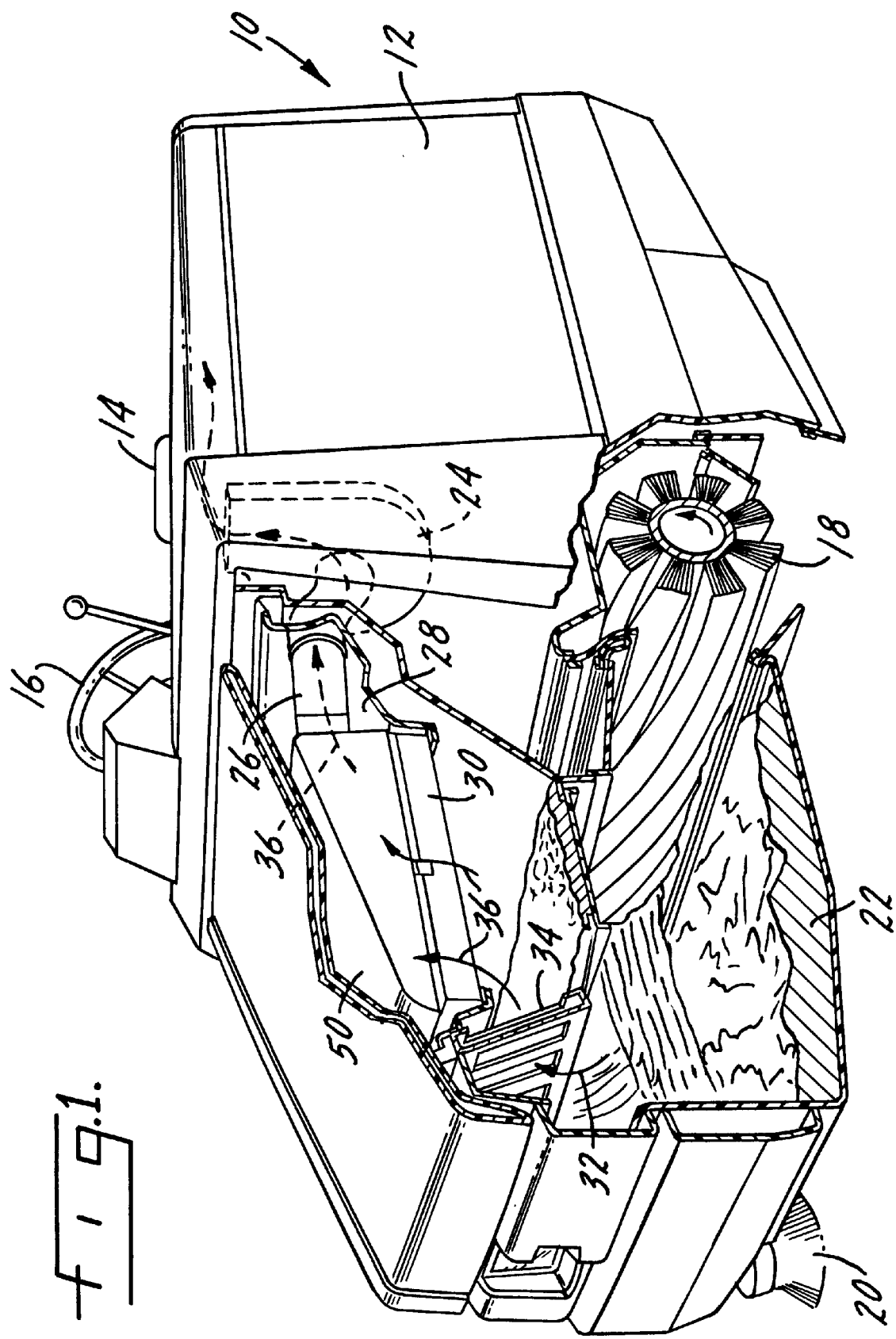

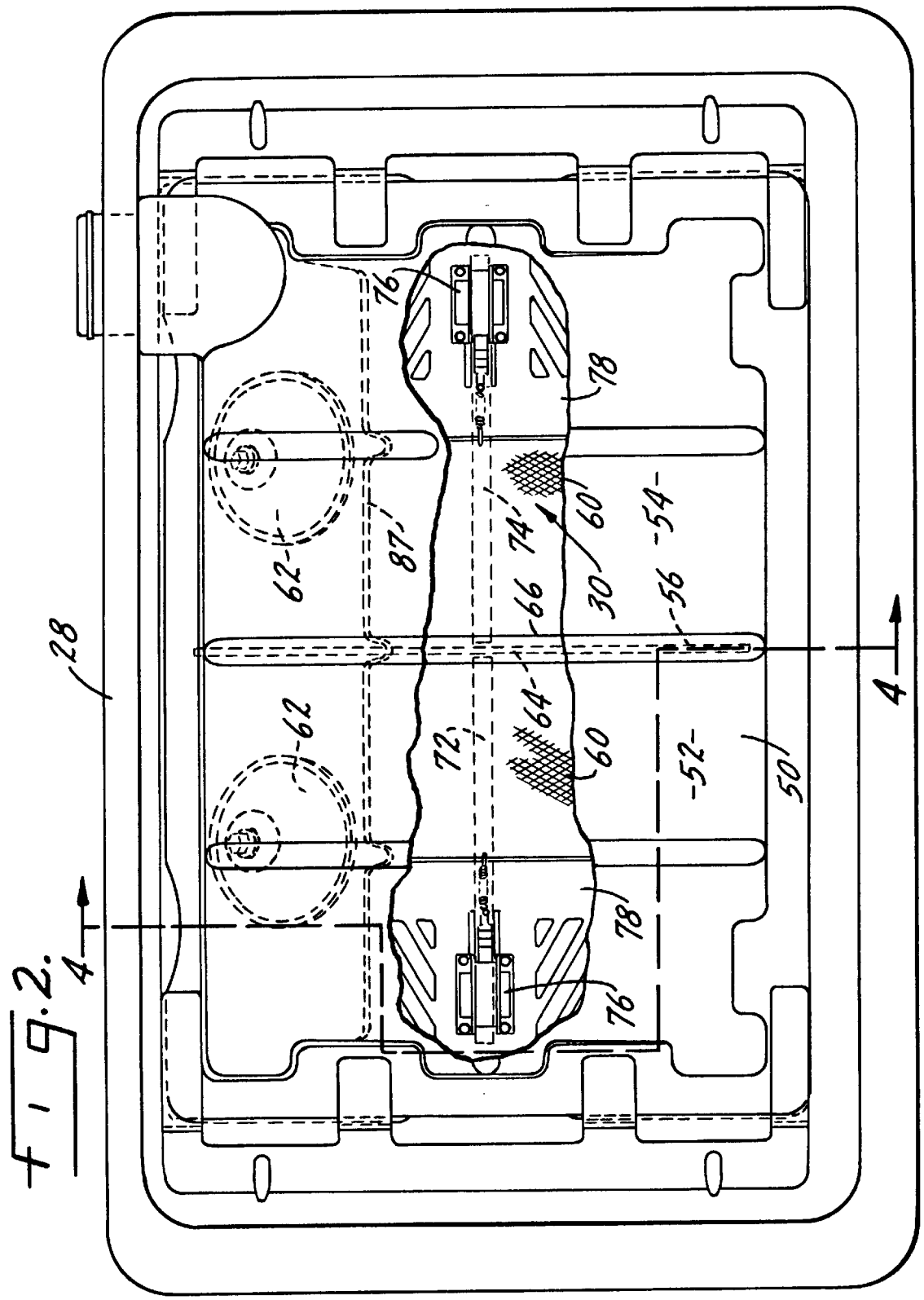

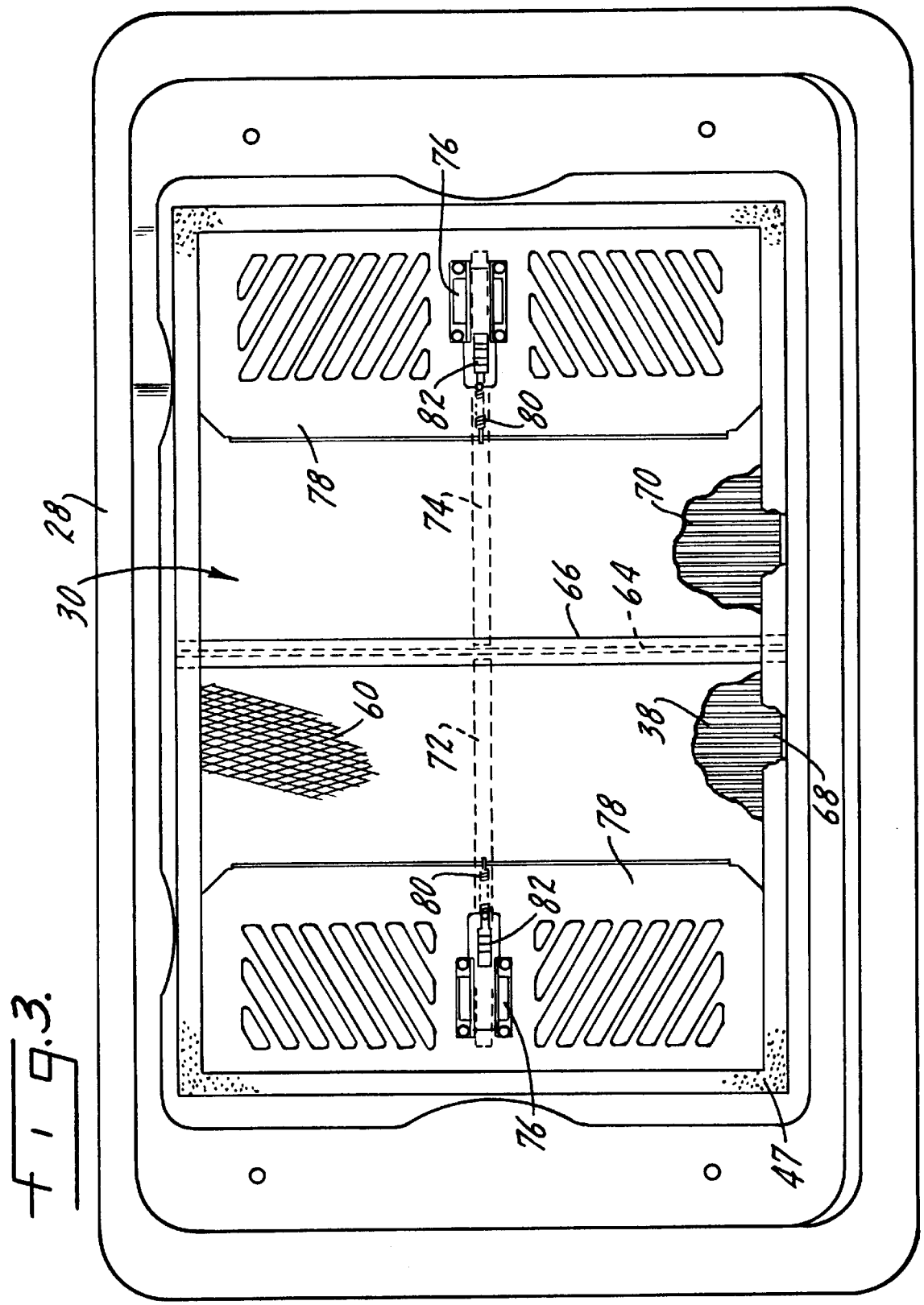

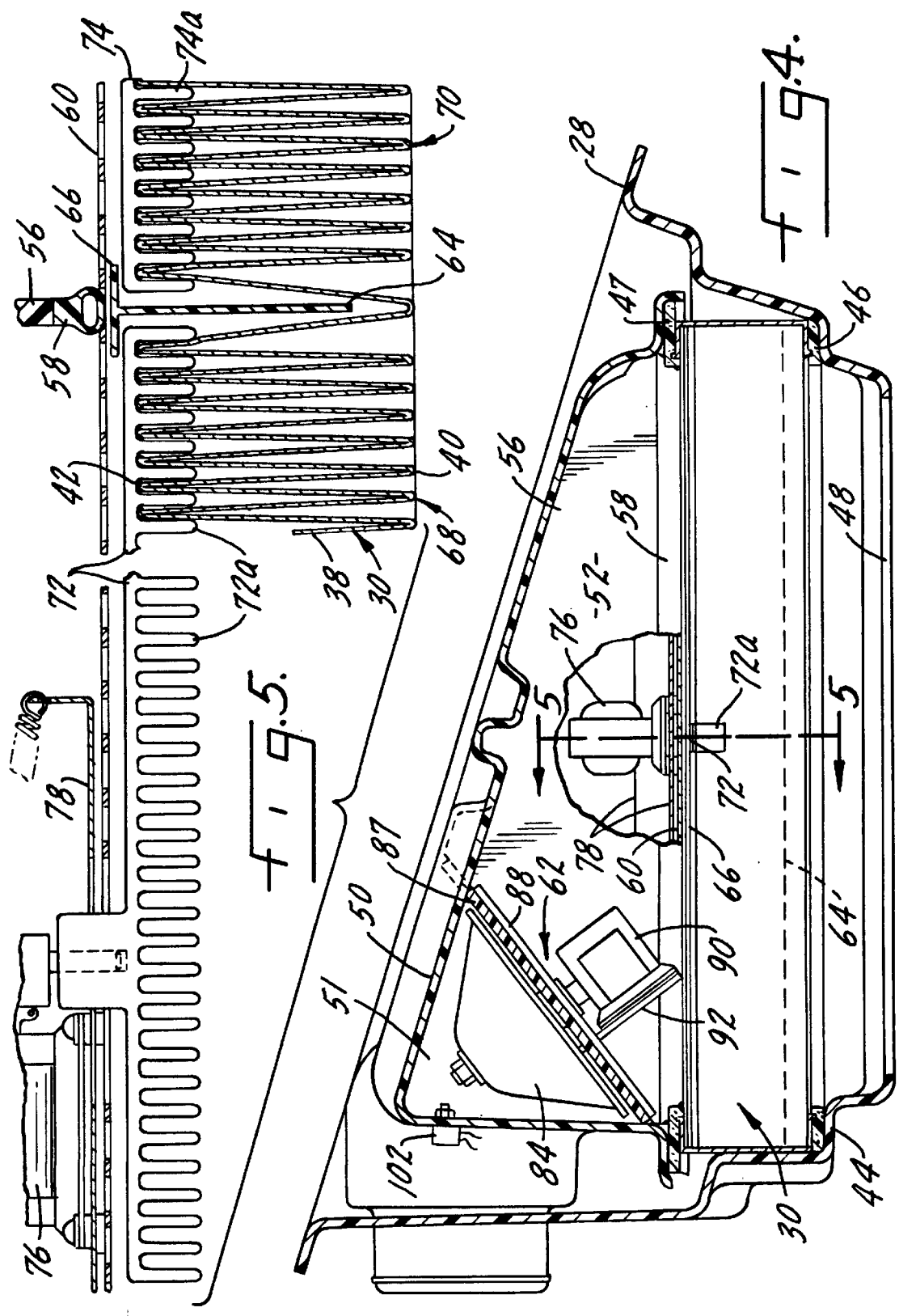

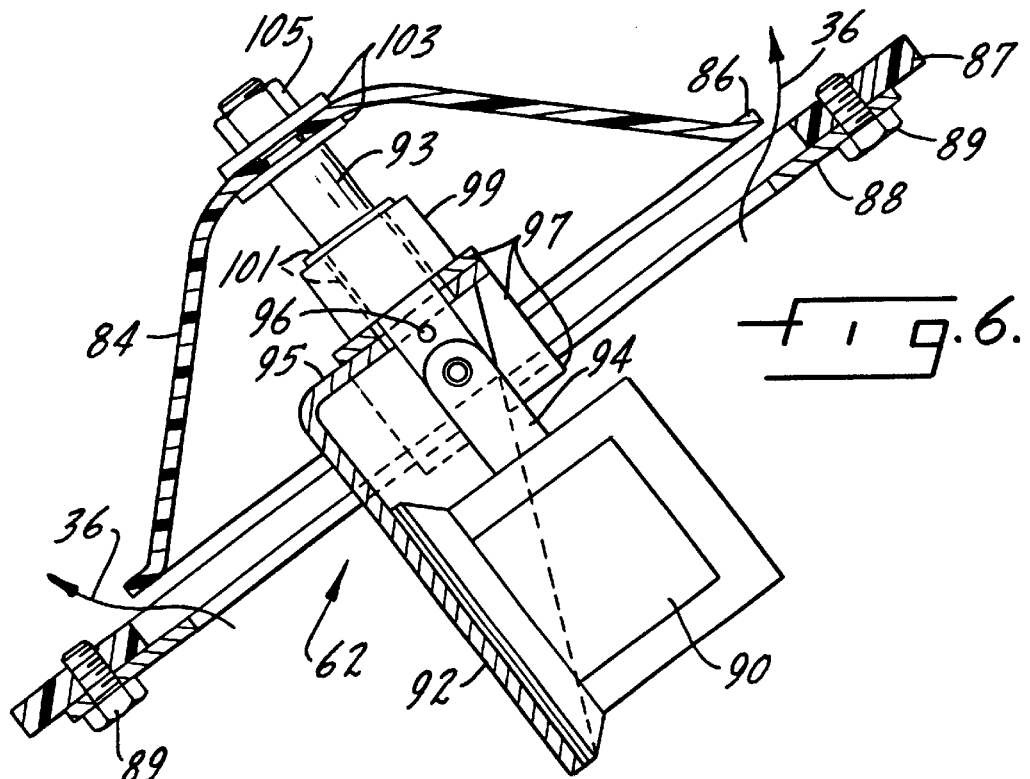
_fig.6._
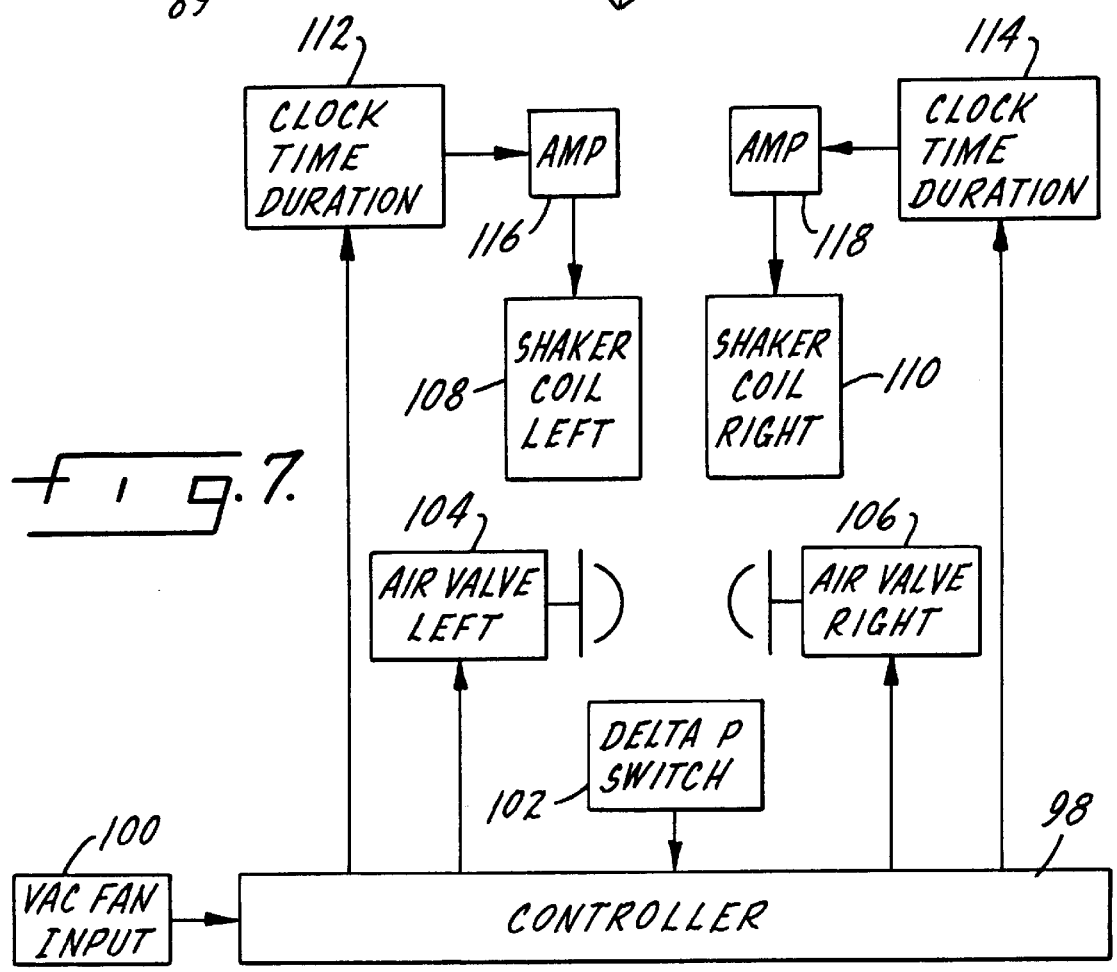
_fig.7._

6,117,200

ELECTROMAGNETIC FILTER CLEANING SYSTEM

This application is a continuation-in-part of application Ser. No. 08/802,372, filed Feb. 19, 1997, entitled "Sweeper with Electromagnetic Filter Cleaning," now U.S. Pat. No. 5,829,094. The '094 patent was a continuation-in-part of application Ser. No. 08/623,698, filed Apr. 15, 1996, now U.S. Pat. No. 5,711,775.

THE FIELD OF THE INVENTION

The present invention relates to sweeping machines of the type shown generally in U.S. Pat. No. 5,013,333, owned by Tennant Company of Minneapolis, Minn., the assignee of the present application. More particularly, the present invention relates to an improved filter cleaning apparatus which substantially increases the life of the filter element.

It is present practice in the sweeping machine art to place a filter in the air flow path of the sweeping machine in such a position that dust is collected below the filter and clean air passes from the filter to the vacuum fan. Such filters are periodically cleaned, principally by shaker bars, as is well known in the art. Shaker bars are not particularly effective as a cleaning device and the filter panel is often cleaned inefficiently and inadequately. The present invention provides electromagnetic shaking of the filter medium by placement of solenoids on the top of the filter medium and then the use of longitudinally extending bars to cause movement of the filter medium. The filter medium is pleated and will be functionally divided into at least two sections. Each section will have a solenoid and a longitudinally extending bar. Only one pleated section will be cleaned at a time and while that pleated section is being cleaned, substantially all of the air flow through the filter will be directed through the non-moving pleated filter section(s).

When power is applied to one of the solenoids, the longitudinally extending bar will move in one direction, with a spring returning the bar in the opposite direction. The solenoid is pulsed so that the vibration imparted to the bar and thus to the filter pleats very effectively cleans the filter through shaking the pleats, causing the dust to fall down into the dust collection chamber. The electromagnetic cleaning of the present invention is relatively quiet, simple in construction, and uses relatively low vibration of the filter medium.

The filter housing which encloses the pleated filter element will have a downstream side above the filter element divided into two chambers, one above each half or section of the single filter element. Each of these chambers will have a valve for controlling air flow from it toward the vacuum fan in the machine dust control system. When the filter needs cleaning, vibratory motion is applied to one section of the pleated filter element while the associated valve above it is closed so that there is negligible air flow through it. The valve remaining open will pass enough air for dust control through the stationary section of the pleated filter element during this time. Each filter section will thus be cleaned in turn, following which normal operation will be resumed, with both valves open and air flow through both sections of the filter element.

SUMMARY OF THE INVENTION

The present invention relates to sweeping machines and in particular to an electromagnetic filter cleaning assembly for sweeping machines.

A primary purpose of the invention is a filter cleaning assembly in which a physically continuous single pleated filter element is functionally divided into at least two separated but joined pleated filter sections, with each section being cleaned intermittently on a timed or a demand basis and with air flow through the filter section being cleaned essentially shut off during cleaning.

Another purpose is a filter cleaning system as described in which there is an electric solenoid for imparting vibratory cleaning movement to each filter section and there is isolation between the pleated filter sections to prevent movement from one section being imparted to the other.

Another purpose is a filter cleaning system as described in which the air flow through the non-moving section of the single pleated filter element is limited so that it does not overload that section while another section is being cleaned.

Another purpose is a filter cleaning system as described in which the time duration and frequency of solenoid operation is controlled to maximize filter cleaning.

Another purpose is a simply constructed, reliable electromagnetic cleaning system in which electrically operated filter shaking actuators are coordinated in operation with electrically operated valves to effect cleaning of a section of the pleated filter element while restricting or essentially eliminating air flow through the section being cleaned.

Another purpose is a reliable, efficient cleaning system for a pleated filter element for use on a surface maintenance machine in which a single filter element is utilized, with the element being cleaned in sections and with no movement of one section being imparted to the other during the cleaning operation.

Other purposes will appear in the ensuing specification, drawings and claims.

BRIEF DESCRIPTION OF THE DRAWINGS

The invention is illustrated diagrammatically in the following drawings wherein:

FIG. 1 is a perspective, with portions broken away, illustrating a surface maintenance machine of the type disclosed herein;

FIG. 2 is a top view of the filter housing having the filter positioned therein;

FIG. 3 is a top view showing the filter element with the filter electric actuators positioned thereon placed within the filter housing, but with the filter cover removed;

FIG. 4 is a section along plane 4—4 of FIG. 2;

FIG. 5 is a section along plane 5—5 of FIG. 4;

FIG. 6 is an enlarged sectional view of one of the valves controlling air flow through the filter housing; and FIG. 7 is a block diagram of the control for the filter system disclosed herein.

DESCRIPTION OF THE PREFERRED EMBODIMENT

U.S. Pat. No. 5,013,333, owned by Tennant Company, the assignee of the present application, shows a filter cleaning mechanism for a pleated filter in which there are two separate filter elements, with the air flow path being divided so that essentially one half of the air flow is through each filter element. When it is necessary to clean one of the filter elements, air flow through it is closed off and all of the air flows through the remaining element. The system can be automatic in that when one filter element is being cleaned, the other filter element will be handling all of the air flow and the filter elements may be cleaned on a timed basis or when the pressure drop across the filter reaches a predetermined point indicating that cleaning is necessary. Cleaning is brought about by shaker bars, which has been the traditional way for cleaning filter elements in surface maintenance machines. The dust control system of the '333 patent requires two filters, whereas, the present application can provide a complete dust control system with the use of only a single filter, which provides substantial cost and space saving.

The '333 patent passes all of the air in the air stream through the filter element which is not being cleaned, which indicates that as many cubic feet per minute of air which would normally pass through two separate filters is all being passed through a single filter. An air filter has a critical air velocity. If it is exceeded, some of the airborne dust particles will be driven into the interior of the filter medium, rather than lodging on the surface, and even a vigorous shaking will not dislodge them. The filter becomes progressively more plugged until it is useless and must be discarded. In the '333 patent cleaning system, it is possible to exceed the critical velocity of air flow when all of the air is directed through only one of the two filters. The present invention eliminates this problem by restricting air flow through the filter section which is not being cleaned to maintain air flow through that portion of the filter below the critical velocity.

Prior art filter shakers of the type shown in the '333 patent impart their energy to the filter frames, which transfer it to the pleats. Further examples of such arrangements are shown in U.S. Pat. Nos. 4,258,451 and 4,345,353, also owned by Tennant Company. Such shakers pound on the filter frames and thus shake all of the pleats in a filter. It is not possible to vibrate or shake a portion of the pleats and leave the rest essentially unmoved. It is for this reason that the automatic cleaning system of the '333 patent has to use two separate filters so that one can be shut off and shaken while the other remains in use. The present invention is capable of using a single filter with one section of the pleats being isolated from the other so that vibratory cleaning motion imparted to one section of filter pleats is not imparted to the other section of filter pleats. This is particularly important because it is critical when drawing dust laden air through a filter panel that the panel not be disturbed by any outside force. If this is not done, and the filter media is shaken even mildly while under vacuum, the media restricts to a point where it has to be discarded or blown out with air to remove the impacted dust.

U.S. Pat. No. 5,711,775, owned by Tennant Company, discloses an electromagnetic filter shaker which eliminates many if not all of the deficiencies of the commonly used shaker bar systems of the prior art. Copending application Ser. No. 08/802,372, also owned by Tennant Company, is an improvement on the shaker mechanism of the '775 patent and illustrates the use of a single solenoid positioned above a pleated filter element, with the application of pulsed power to the solenoid causing it to move a comb which is in engagement with the filter pleats to impart vibratory movement to the pleats. The comb moves in one direction when the solenoid is actuated and moves in the opposite direction by use of a return spring. The details of the '372 application are herein incorporated by reference, as the present invention uses essentially the same solenoid arrangement except that the single pleated filter element is functionally separated into two isolated sections and there is a solenoid for moving a comb for each section.

Focusing on FIG. 1, a mobile surface maintenance machine is indicated generally at 10 and includes a body 12 which will typically be mounted on a plurality of wheels. Conventionally, there may be two rear wheels and a front wheel or there may be a reverse of this wheel arrangement. The driver or operator will be located on a seat 14 and will have a steering wheel 16 and suitable controls for operating the machine.

There is a main sweeping rotary brush 18 and there may be a side brush 20. The brush 18 will direct dust and debris into a hopper 22. It is important in a sweeping machine of this type to minimize what is characterized as "dusting" and that occurs when the filter which is a part of the dust collection system becomes clogged and no longer will pass air through to the vacuum fan. The present invention is directed toward cleaning the filter to prevent dusting. The air cleaning system includes a vacuum fan 24 which is connected through a conduit 26 with a filter housing 28 within which is positioned a pleated filter 30. The air flow path created by the fan 24 will begin within the debris hopper 22, as indicated by arrow 32. The dust laden air will pass through a baffle plate 34 and then through the filter 30. After passing through the filter 30, as indicated by the arrows 36, the dust-free air will flow into the housing 28, then through the conduit 26 to the vacuum fan, after which it is exhausted to atmosphere. The vacuum fan is driven by a hydraulic motor controlled by an electro-hydraulic valve.

FIGS. 2 through 6 illustrate the details of the filter housing, the filter, and the shaker system for the filter. The filter 30, FIGS. 3, 4 and 5, has a non-woven media formed into a plurality of pleats 38, each of which is connected by lower folds 40 and upper folds 42. The filter is positioned within filter housing 28 and the filter will rest upon a shoulder 44 which is a part of the housing. There may be a peripheral seal 46 between the lower edge of the filter 30 and the filter housing 28. There is a peripheral seal 47 between the top of the filter and a cover 50. The housing 28 has an air inlet 48 through which the air is drawn by the vacuum fan 24. On top of the filter there is a cover 50, which is a part of the filter housing. The space above the filter, or at its downstream side, is divided into two chambers 52 and 54. A wall 56 provides division between the two chambers. The wall 56 may be integrally molded with the cover and there may be a seal element 58 along the lower edge of the wall 56, between it and a screen mesh 60 which forms the top of the filter assembly.

Each of the chambers 52 and 54 includes an identical electrically-operated valve assembly 62 which controls the passage of air from each of the chambers, after it has been drawn through the filter. After air passes through an open valve assembly, it will flow into a back chamber 51, to the conduit 26 and then to the vacuum fan. A differential pressure (Delta P) switch 102 is shown in FIG. 4. It may be located wherever convenient in the filter cover 50, and senses the difference in air pressure between the space above the filter and ambient atmosphere.

The filter element 38 is a single pleated filter formed of a suitable non-woven media. It is separated into two sections by a divider or separator 64 shown in FIG. 5, which may have a generally T-shaped configuration, with the top of the T being indicated at 66, or may be otherwise configured. Each of the sections of pleats, the left-hand section being indicated at 68 in FIG. 5 and the right-hand section at 70 in FIG. 5, will be cleaned by being vibrated by means of a comb; 72 for the left-hand side and 74 for the right-hand side. The combs may be formed of a suitable plastic and each will have downwardly-extending teeth 72a and 74a which extend between adjacent pleats. The combs will be moved by solenoids indicated at 76 in FIG. 3 and shown and described in more detail in the copending '372 application. Each of the solenoids 76 is mounted on a plate 78, with the plates overlying the screen mesh 60. There is a coil spring 80 connected at one end to a bar 82 which extends out from and is movable by the solenoid, with the other end of the spring being attached to the plate 78. Each bar 82 in turn is attached to a comb. Thus, when the solenoid receives pulsed electrical power it will move the bar 82 and thus one of the combs in a direction toward the solenoid and when power is removed, the return spring 80 will move the bar 82 and an associated comb in the opposite direction, thus providing vibratory motion to the pleats. The combs are not in contact with each other and are separated by the divider 64. Thus, vibratory motion of one set of pleats caused by applying pulsed power to one solenoid will only impart vibratory shaking motion to one pleat section, with the other pleat section remaining isolated and stationary.

The incoming air flowing in the direction of arrows 36 will pass through the inlet 48, which is common to both pleated filter sections, and then the air will be divided and will pass through the generally equal pleat sections 68 and 70, through the screen mesh 60, and then into the two chambers 52 and 54. Assuming a cleaning action is not taking place, the air will pass through the open valve assemblies 62, into the back chamber 51, to the conduit 26, and then to the vacuum fan 24.

Each of the valve assemblies 62 includes a valve element 84 shown in FIG. 6 and having a generally conical configuration. The element 84 has a peripheral annular flange 86, which in the closed position will be seated against a generally circular annular plate 88, which is attached to cross plate 87 with screws 89. Cross plate 87, with cover 50, defines back chamber 51. Normally, the flow of air 36 through the valve assembly will maintain the valve element 84 in the open position shown in FIG. 6. A solenoid 90 is attached to a mounting bracket 92, with the solenoid plunger 94 being connected to valve stem 93. Valve element 84 is attached to valve stem 93 in conventional manner with two flat washers 103 and nut 105. The valve stem 93 carries a cross pin 96 which may contact a portion 95 of bracket 92 to limit upward movement of the valve stem 93 and the valve element 84 to the position shown in FIG. 6. Thus, the cross pin limits the extent of the air opening or the size of the air flow passage through the valve assembly 62. No return spring is required, as the valve is opened by air flow and closed by activation of the solenoid 90. An offset strap 97 connects bracket 92 to annular plate 88. A tubular member 99 is attached to strap 97, and a bushing 101 within tubular member 99 serves as a guide for valve stem 93 to slide in freely. Tubular member 99, strap 97, bracket 92 and annular plate 88 together comprise one welded assembly.

The control circuit for operation of the shakers and the valve assemblies is indicated in FIG. 7. Whenever the vacuum fan 24 is operating, the controller 98 will receive an input signal 100 from the vacuum fan control valve and will place and maintain the filter cleaning system in a ready state. A further input from the differential pressure (Delta P) switch 102 may be used to sense the pressure differential across the filter sections and thereby serve to initiate a cleaning cycle. The left air valve is indicated at 104 and the right air valve is indicated at 106, the air valves being the valve assemblies shown generally at 62 and described in connection with the description of FIG. 6. The shaker coils indicated at 108 and 110 are the solenoids 76 which move the combs 72 and 74 to vibrate the pleated filter sections. The controller 98 may be connected to a clock time duration circuit 112 for the left side shaker coil and air valve and to a clock time duration circuit 114 for the right side shaker coil and air valve.

In operation, and assuming a fully automatic system is desired, the Delta P switch will sense the pressure differential across the filter, which is indicative of the degree to which the filter has become clogged and is limiting the passage of air, and at a predetermined pressure differential will signal the controller to initiate a cleaning cycle. The controller will first cause one of the filter sections to be cleaned and then the other. For example, if the left side is to be cleaned first, the left air valve will be closed and the left shaker coil 108 will be operated by the application of a signal from the clock circuit 112 through an amplifier 116 to the shaker coil. The clock circuit 112 will determine the period during which the shaker coil is pulsed, and it is the application of pulsed power which is used to vibrate the pleats to clean them. Once the left side has been cleaned, the left air valve will open and the right air valve will be closed. The right shaker coil 110 will then receive an operating signal from clock circuit 114 through amplifier 118 and it will then operate for a predetermined period of time in order to clean the right side of the single filter element.

The invention should not be limited to an operating system in which the pressure drop across the filter triggers operation of the cleaning cycle. Cleaning may be done on a timed basis or manually, when required by the operator, once the operator has noticed that the machine is dusting.

Filters must be stationary when they are performing their filter function. It is for this reason that the two sections of the single filter element are isolated and the vibratory motion applied to one side is kept from effecting or imparting movement to the other side. Similarly, an air filter can only remove dust from a certain amount of air, and more specifically, the volume of air passing through a filter must not exceed what is called the "critical air velocity." If this air velocity is exceeded, some of the airborne dust particles will be driven into the interior of the filter medium rather than lodging on its surface and even a vigorous shaking will not dislodge them. The filter becomes progressively more plugged until it is useless and must be discarded. It is for this reason that the cross pin 96 limits the air flow passage through either valve assembly 62 to a value below the critical air velocity.

Assume as an example that the vacuum fan develops enough suction to pull 450 cubic ft. per minute (cfm) of air through the system when both valve assemblies are open and that the filter has 78.78 sq. ft. of area in its pleats, so the air velocity is 5.7 ft./min. This is below the critical velocity which is about 7.5 ft./min. for the type of filter and shaker system being used in this example. When one valve assembly is closed, indicative of a cleaning of that portion of the filter, all of the air will be forced to flow through the open portion of the filter. If the full 450 cfm were passed through half of the filter, the air velocity would be 11.4 ft./min. which is above the critical velocity. But by limiting the rise of the valve element 84, the air passage is restricted during the cleaning cycle so that only 280 cfm passes through the open half of the filter. This restricted air flow is more than 50 percent of the total 450 cfm because the fan characteristic is such that it develops more vacuum if its intake is restricted. The effect is to have 7.11 ft./min. of air flow through the open side, which is below the critical velocity but enough to maintain the dust collection system working adequately during the period of filter cleaning.

Whereas the preferred form of the invention has been shown and described herein, it should be realized that there may be many modifications, substitutions and alterations thereto.

What is claimed is:

1. An air exhaust system for controlling dust in a mobile surface maintenance machine including a vacuum fan, a filter housing having an air inlet, filter means positioned within said housing with an upstream side thereof being in communication with said housing air inlet, said filter housing including separate chambers on a downstream side of said filter means, valve means for independently controlling the flow of air from each chamber through the filter housing and toward the vacuum fan, said filter means being divided into sections which are independently movable for cleaning thereof, each section being aligned with a filter housing chamber, electromagnetic means positioned adjacent each filter means section for imparting a cleaning vibratory motion thereto, said filter means sections being isolated, one from the other, such that vibratory motion of one section is not transferred to the other, means for operating said valve means to restrict the flow of air from one chamber when the filter means section aligned therewith has vibratory cleaning motion imparted thereto, said valve means being opened by the flow of air through said filter housing and being closed when electric power is applied thereto.

2. The air exhaust system of claim 1 wherein said filter means comprises a single pleated filter element.

3. The air exhaust system of claim 2 wherein there are a plurality of pleats within each filter section.

4. The air exhaust system of claim 3 wherein said electromagnetic means includes an electric actuator for each pleated filter section, a pleat moving element for each pleated filter section, associated with and movable upon the application of electric power to an actuator.

5. The air exhaust system of claim 4 including a separator positioned between said pleated filter sections, preventing movement of one pleat moving element from causing movement of the other pleat moving element.

6. The air exhaust system of claim 1 wherein said valve means are mounted in the filter housing.

7. The air exhaust system of claim 1 wherein there are means limiting the opening movement of each valve means.

8. The air exhaust system of claim 7 wherein the means limiting opening movement of each valve means limits the size of the valve means opening so that the air velocity therethrough is below the critical velocity for the filter means section through which air flows before reaching the valve means.

9. The air exhaust system of claim 1 wherein said filter means comprises a single pleated filter element, there being a plurality of pleats within each filter section, an actuator for each pleated filter section, a pleat moving element for each pleated filter section associated with and movable upon the application of electric power to an actuator, means for applying pulsed power to each actuator to cause movement of said pleat moving element in one direction, yielding means for moving said pleat moving element in an opposite direction, with the application of pulsed power to an actuator moving the pleat moving element in said one direction and said yielding means moving said pleat moving element in the opposite direction upon termination of the pulsed power to said actuator, whereby said pleat moving element imparts a shaking, cleaning movement to the pleats associated therewith.

10. The air exhaust system of claim 9 wherein each pleat moving element is in the form of a comb, with an upper longitudinally extending member and a plurality of downwardly extending teeth which are located between pairs of adjacent pleats.

11. The air exhaust system of claim 10 wherein said valve means includes an electrically operable valve element associated with each chamber, each said valve element being opened by the flow of air through its associated chamber, and closed by the application of electric power thereto.

12. The air exhaust system of claim 11 including an electric circuit controlling the application of power to said electrically operable valve elements, and said actuators, whereby when pulsed electric power is applied to an actuator associated with one filter chamber, electric power is applied to the valve element associated with that chamber to move said valve element to a closed position.

13. The air exhaust system of claim 11 further including means limiting opening movement of each valve element.

* * * * *